June 27, 1967  D. R. RIFFE  3,328,202

COMPOSITE ELECTRODE

Filed Oct. 30, 1963

WITNESSES:
Bernard R. Gregory
James F. Young

INVENTOR
Delmar R. Riffe

BY
Frederick Hopoz
ATTORNEY 3,328,202
COMPOSITE ELECTRODE
Delmar R. Riffe, Murrysville, Pa., assignor to Westinghouse Electric Corporation, Pittsburgh, Pa., a corporation of Pennsylvania
Filed Oct. 30, 1963, Ser. No. 320,034
7 Claims. (Cl. 136—22)

This invention relates to the storage of electrical energy and in particular concerns novel composite electrodes and secondary cells and batteries that include at least one of the composite electrodes as an important element.

It is a primary object of the present invention to provide a composite electrode for use in secondary cells and storage batteries that is easily prepared from readily available materials, that eliminates parts heretofore necessary and makes possible other simplifications in cells and batteries with which the new electrode may be used.

A further object of the invention is to provide a composite electrode to retain bromine in a zinc bromide cell all in accordance with the foregoing object.

Other objects will be apparent from time to time in the following detailed description and discussion given in conjunction with the attached drawing in which.

Figure 1:
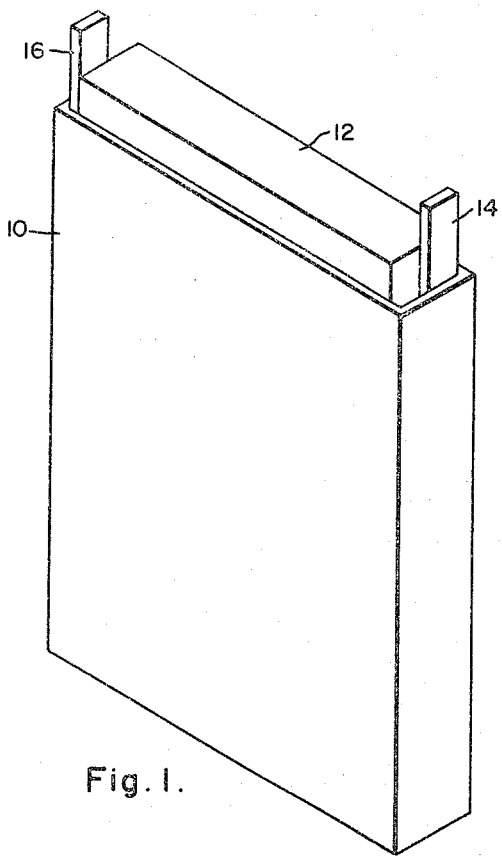
FIG. 1 is a perspective view of a cell that includes a composite electrode of this invention.

It is evident, on a theoretical basis, that a zinc-bromine secondary cell should be capable of providing a high energy storage capacity. The reactions that take place in a zinc-bromine cell can be indicated as follows.

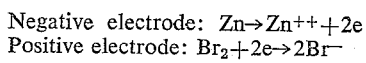

Negative electrode: $Zn \rightarrow Zn^{++} + 2e$
Positive electrode: $Br_2 + 2e \rightarrow 2Br^-$ and the overall reaction is:

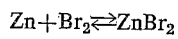

$$Zn + Br_2 \rightleftharpoons ZnBr_2$$

The electrons associated with each zinc atom flow through an external electrical circuit to the positive electrode where they are discharged in producing bromine ions, and thus the free energy of the reaction of zinc and bromine to form zinc bromide can be made available as electrical energy.

It can be shown that the free energy of reaction of zinc and bromine can provide, theoretically, an electrical output of about 196 watt hours per pound, and such a cell would have an open circuit voltage on the order of about 1.8 volts at 25° C. However, since a cell cannot be composed solely of the active components, it is evident that the electrical output in watt hours per pound of cell cannot be that determined solely from the free energy. By way of example, a conventional lead storage battery can provide only about 5 percent of the electrical output that theory indicates should be available. The losses result primarily from the added mass required for the electrolyte, for electrode structure, for cell structure, casing and the like.

In constructing a cell with zinc and bromine as the negative and positive electrodes, respectively, one of the problems is the distribution of the bromine relative to the physical electrode that serves as a positive terminal for the external circuit. In the charged state, the bromine in the cell is in the liquid state at normal conditions of temperature and pressure and accordingly tends to seek its own level. Nevertheless, that bromine should be distributed along its electrode to provide good reaction.

In accordance with the present invention, the bromine-zinc system based upon an aqueous zinc bromide electrolyte is used; from its metallic zinc and molecular bromine are generated at the physical electrodes during charging. Zinc and bromine react rapidly when they contact. As already noted, bromine is liquid at ordinary conditions. For purposes of this invention, the liquid bromine is adsorbed on activated charcoal. By providing this adsorption media in particular form along with other cell structure, the present invention provides simplified cell structure, slows reaction of the zinc and bromine and provides good contact of the bromine along the physical positive electrode.

Thus in one embodiment, the present invention provides a composite electrode comprising a shape of activated carbon. By the term shape is meant to indicate a physical entity such as a hollow cylinder, a slab, or other form and to distinguish a mere mass of powders, particles, granules or the like. Activated carbon is a well known article of commerce, and generally is produced by destructive distillation or destructive dehydration of carbonaceous materials such, for example, as coconut and other nut shells as well as coal, animal bones, lignite, paper mill waste liquor and the like. However formed, the carbon can be admixed with a small amount of an adhesive, shaped as desired and then is heated to cure the adhesive. Such shapes can be obtained from commercial suppliers of activated carbon. The shape suitably has opposed major surfaces, that are usually, but not necessarily, substantially parallel. On one of these surfaces there is provided a substantially nonporous, electrically conducting coating. This coating can be made from carbon also, but should be dense so that it is a good electrical conductor for it serves as an electrode terminal in the cells. The resulting composite thus comprises a unitary structure having a substantial volume that adsorbs bromine and a relatively thin coating that is a good electrical conductor and serves as a terminal.

The composite electrodes in accordance with this invention may include a separator member or framework made of a material that is inert with respect to the active components of the cell, that is electrically nonconducting but is porous so that reaction can take place upon passage of ions therethrough. There are many materials that can be used for this purpose. Organic resins are particularly useful because they have many suitable properties such as inertness, easy formability and strength, and are relatively lightweight, thereby not introducing unnecessary weight. A typical material is polyvinyl chloride resin, which is sufficiently porous to permit passage of the ionic zinc and bromine. Suitably glass mesh screening is used with the sheet of polyvinyl chloride. It has been found that a composite separator as just indicated aids in preventing internal shorting by growth of zinc dendrites therethrough as a result of charging. This member is located against the major surface of a composite electrode that is not coated with the conducting material described above.

The invention will be described further in conjunction with the attached drawing. It should be understood that the details given for purposes of illustration are not to be construed as limiting. Moreover, although the drawings show certain specific embodiments, it should be apparent that the invention is not limited thereto.

Referring to the drawings, a cell or battery of the invention is provided with a casing member 10 that, in the embodiment shown, is of generally rectangular cross-section, though other shapes could as well be employed. The casing member is composed of any suitable nonconducting material such, for example, as hard rubber, or a synthetic material such as polyethylene, polycarbonate, nylon, acrylic resin and so on.

At its top the casing 10 is provided with a cover member 12 that may be made of the same material, and in any event is non-conducting. Cover member 12 extends above the active area of the cell within the casing and can be considered, in part, as an expansion chamber because the active cell components have different volumes in the charged and discharged states. Extending upwardly through or adjacent the top member 12 are the electrode terminals 14 and 16. While these are shown at opposite ends for clarity, it will be apparent that both may be at the same end of a cell or battery, as design considerations dictate.

Figure 2:
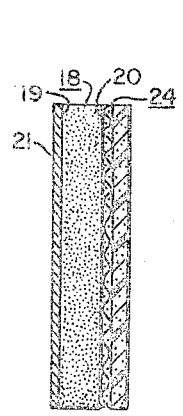
FIG. 2 shows an end view of a composite electrode of this invention.

Referring now to FIGURE 2, there is shown an end view of a composite electrode that includes a shape 18 of an adsorption media, for example activated carbon or the like as indicated in detail hereinbefore. Along one of its major surfaces 19 and 20 is a coating 21 that is thin relative to the activated carbon shape 18. The coating 21 is an integral part of the composite electrode, and suitably is applied to one of the surfaces of the activated carbon shape 18 and then fired thereto at a temperature sufficient to convert the coating to a substantially uniform dense thin mass. Any material desired can be used for this purpose. For example a mixture of conductive oxides can be used. Similarly carbon can be applied thereto. In one satisfactory practice, the conductive material is admixed with a binder, and then is painted, brushed or otherwise applied to the surface and fired in situ. A satisfactory coating is provided by a mixture of carbon and a carbonizable material, for example, a polymer of trifluorochloroethylene (Kel-F) or other halogenated hydrocarbon. This mixture carbonizes to a conductive, impervious (to the electrolyte) glaze or coating upon firing a thin coating of it on the activated carbon body. Thick coatings may have a small pore volume remaining after firing. If so, the pores can be filled with an impregnant, that may be conducting or non-conducting, with care being taken so that the impregnant does not unduly pass through the glazing and enter the activated charcoal region and thereby diminish its adsorptive capacity.

A composite electrode of this invention can include a separator 24 along the major surface, of the activated carbon body 18, that is not covered with the conductive coating 21. The separator 24 can comprise a sheet of polyvinyl chloride and a glass mesh screen, suitably with the screen portion against the activated carbon. In any event, it is electrically non-conducting and is sufficiently porous to permit passage of ions and molecular bromine. The separator 24 can be maintained against the surface of the shape 18 of activated carbon by auxiliary spacing structure (not shown), by suitable internal ribbing in the casing, by an adhesive or by any other desired manner.

A cell is made with the structure of a composite electrode and separator as just described upon including therewith a carbon terminating plate spaced from or opposed to the surface of the separator. These elements are located in a suitable casing, and electrolyte is placed in the zone between the separator and the terminating plate. Leads are provided to the carbon plate and the conducting coating on the composite electrode. Upon application of charging current, zinc is electroplated on the carbon terminating plate while bromine is produced and is diffused through the separator and into the activated carbon body where it is adsorbed.

Figure 3:
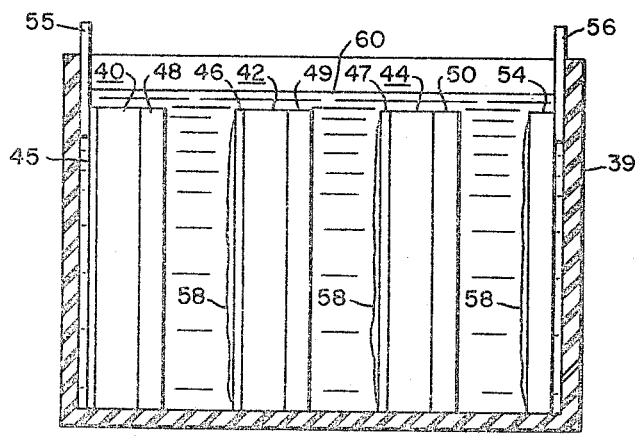
FIG. 3 is an end view of one form of battery that includes the novel composite electrodes of the invention.

A greater advantage in the invention is realized in a series connected battery of cells including the described composite electrode, for example in a three cell battery. Such a battery is shown in FIG. 3 and includes within an insulating casing member 39 three of the composite electrodes 40, 42 and 44, and each of which has the described conductive coating 45, 46 and 47 on one major surface and non-conductive separators 48, 49 and 50 along the other major surface. These electrodes are spaced from one another in the casing 39 that also includes a carbon terminating plate 54 spaced from the end composite electrode 44 opposite or facing the separator 50 on that electrode. Terminal leads 56 and 55 are then provided, one from the carbon terminating plate 54 and the other from the conducting coating 45 on the end composite electrode 40 most remote from the carbon terminating plate 54. Upon adding aqueous zinc bromide 60 to the assembled cells and applying a charging current, layer 58 of zinc will plate on coatings 46 and 47 of electrodes 42 and 44 as well as on the terminating plate 54. The bromine generated is adsorbed in the activated carbon portions of each of the composite electrodes. The battery is then ready for use.

It can be observed that the central composite electrodes 42 and 44 each functions, in such a battery, as the negative electrode of one cell by virtue of the zinc deposited on its conductive coating, and as a positive electrode in the next adjacent cell by adsorption of bromine in its activated carbon shape. The electrodeposited zinc makes good electrical contact with the conductive coatings and thus special intra-cell leads are unnecessary.

In cells of the invention, activated carbon shapes having an adsorption of about one gram or more of bromine per gram of carbon have been tested successfully. By use of the principles of the invention, it has been found that cell and battery structure is considerably simplified. For example, the thin conductive coating on such electrode permits the omission of a dense carbon plate heretofore thought necessary. Since the activated carbon distributes the bromine along the conductive coating, special framework or a distributing system are not needed. These and similar considerations contribute to the marked decrease in weight of non-active materials needed, resulting in a higher capacity per pound of cell. Further, high drain rates are possible since diffusion of bromine within the electrodes does not limit the cell drain rate.

While the invention has been described in detail, it should be understood that changes, modifications and the like can be made without departing from its scope.

What is claimed is:

1. In a storage battery cell having active electrodes of bromine and zinc in a zinc bromide electrolyte, the improvement in combination therewith comprising a composite electrode of adsorptive activated carbon having opposed major surfaces, an electrically conducting, substantially non-porous coating bonded to one of the major surfaces, a porous, non-conducting member along the other major surface of said shape, a dense, conductive terminating plate within the container spaced from the porous non-conducting member, a zinc coating on a surface of the terminating plate that faces the porous, non-conducting member, and liquid bromine adsorbed in the shape of adsorptive media.

2. In a battery cell having active electrodes of bromine and zinc and a zinc bromide electrolyte, the improvement in combination therewith comprising a composite electrode of a shape of porous activated carbon having opposed major surfaces, a substantially non-porous electrically conducting coating on one of the opposed major surfaces of the shape of activated carbon, and a porous electrically non-conducting coating on the other of the opposed major surfaces of the shape of activated carbon.

3. A battery cell in accordance with claim 2 in which the non-porous electrically conducting coating is a dense layer of carbon bonded to one of the surfaces of the shape of activated carbon to form a unitary structure therewith.

4. A secondary battery cell comprising a container, a shape of activated carbon having opposed major surfaces disposed within said container, an electrically conducting, substantially non-porous coating on one of the major surfaces of the shape of activated carbon, a porous, non-conducting member composed of an organic material and glass screen along the other major surfaces of said shape, a dense, conductive terminating plate within the container spaced from the porous non-conducting member, a zinc coating on the electrically conducting non-porous coating, a zinc coating on a surface of the terminating plate that faces the porous, non-conducting member, bromine adsorbed in the shape of activated carbon and an aqueous zinc bromide electrolyte within said container.

5. A secondary battery of at least two cells comprising a container, a first shape of adsorptive activated carbon having opposed major surfaces disposed within said container, an electrically conducting, substantially non-porous coating on one of the major surfaces of the first shape, forming a unitary structure therewith, a porous, non-conducting member along the other major surface of said shape; a second shape of activated carbon having opposed major surfaces disposed within the container, an electrically conducting, substantially non-porous coating on a major surface of the second shape that faces said first shape forming a unitary structure with the second shape, a layer of zinc on the coating on the second shape; a porous, non-conducting member along the other major surface of said second shape; a dense, conducting terminating plate within the container spaced from and opposing the non-conducting member associated with said second shape, a layer of zinc on the surface of the terminating plate opposing the non-conducting member; liquid bromine adsorbed in the shapes of adsorptive media; a first electrical lead to said terminating plate, a second electrical lead to the electrical conducting coating on the surface of the first shape and an aqueous zinc bromide electrolyte within the container.

6. In a battery cell having active electrodes of zinc and bromine and a zinc bromide electrolyte, the improvement in combination therewith comprising a shape of porous activated carbon having opposed major surfaces, a substantially non-porous electrically conducting coating on one of the opposed major surfaces of the shape of activated carbon, and a porous electrically non-conducing layer on the other of the opposed major surfaces, the said non-conducting layer comprising a sheet of microporous resin and an interposed liquid permeable spacer member.

7. A battery cell in accordance with claim 6 wherein said non-porous electrically conducting coating is a relatively thin layer of non-porous dense carbon.

References Cited
UNITED STATES PATENTS

| | | | |
|---|---|---|---|
| 2,588,170 | 3/1952 | Smith | 136—22 X |
| 2,807,658 | 9/1957 | Hatfield | 136—121 X |
| 2,907,809 | 10/1959 | Southworth et al. | 136—121 |
| 3,134,698 | 5/1964 | Neipert et al. | 136—121 X |
| 3,201,281 | 8/1965 | Solomon et al. | 136—30 |
| 3,212,930 | 10/1965 | Thompson et al. | 136—120 X |

WINSTON A. DOUGLAS, *Primary Examiner.*

A. SKAPARS, B. OHLENDORF, *Assistant Examiners.*